United States Patent [19]
Duer

[11] 4,070,119
[45] Jan. 24, 1978

[54] TUBE JOINTS

[76] Inventor: Gregory F. Duer, P.O. Box 175, Western Springs, Ill. 60104

[21] Appl. No.: 714,296

[22] Filed: Aug. 16, 1976

[51] Int. Cl.² ............................................. F16B 1/00
[52] U.S. Cl. ...................................... 403/12; 403/19; 403/292
[58] Field of Search ............... 403/298, 292, 293, 295, 403/12, 19; 285/397, 370

[56] References Cited
U.S. PATENT DOCUMENTS

| 1,952,109 | 3/1934 | Woodward | 403/19 X |
| 1,980,530 | 11/1934 | Hutchison | 285/397 X |
| 3,503,639 | 3/1970 | Taylor | 403/295 X |
| 3,864,051 | 2/1975 | Reid | 403/292 X |

FOREIGN PATENT DOCUMENTS

| 214,973 | 9/1957 | Australia | 403/292 |
| 733,078 | 7/1955 | United Kingdom | 403/292 |
| 1,204,030 | 9/1970 | United Kingdom | 403/295 |

Primary Examiner—Andrew V. Kundrat
Attorney, Agent, or Firm—Kinzer, Plyer, Dorn & McEachran

[57] ABSTRACT

Tubes are joined using a stud which supports locking elements inside the tube; a cleaner joint and a stronger one are achieved by a unique form of stud.

4 Claims, 8 Drawing Figures

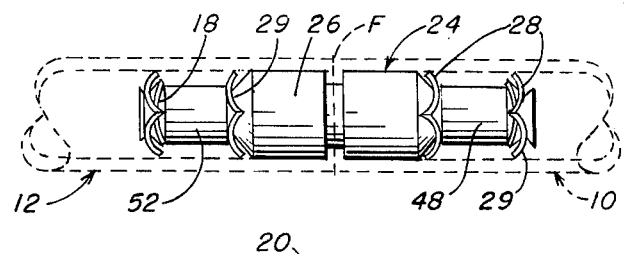
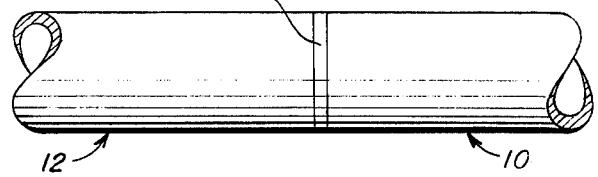
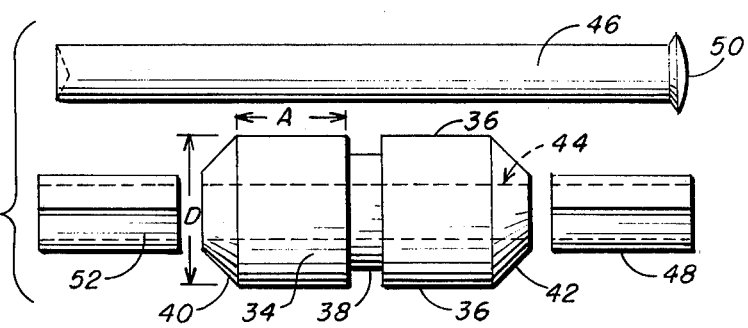
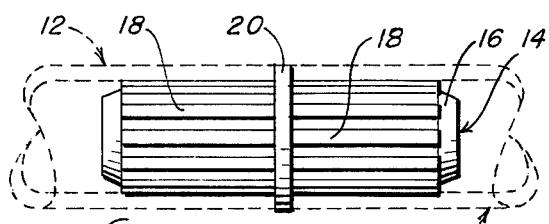
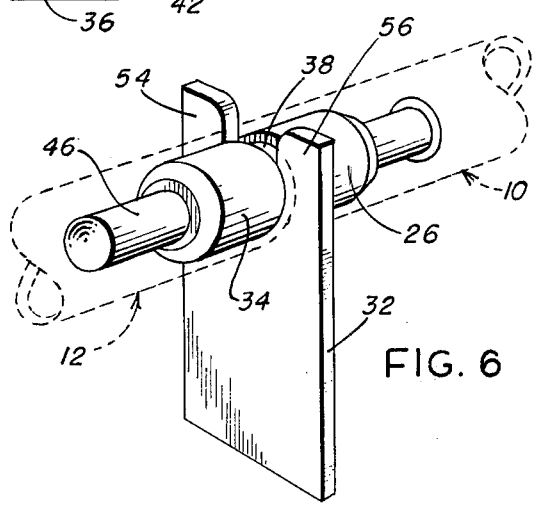
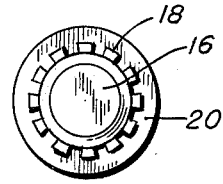
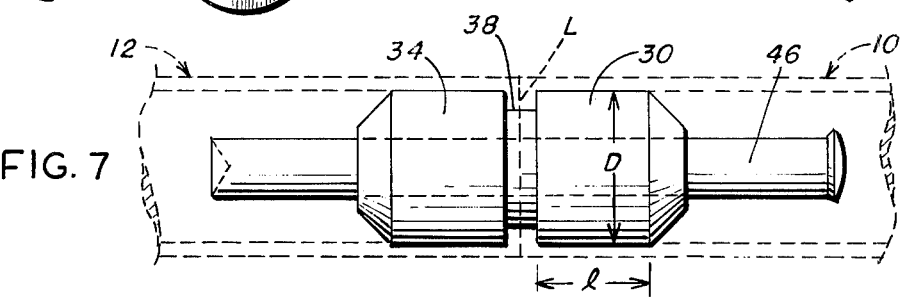
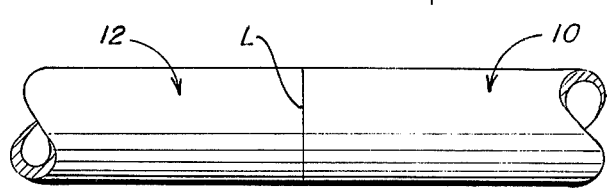

TUBE JOINTS

This invention relates to a fastener for joining the ends of tubes.

One way of joining tubular ends will be explained below in terms of known prior art shown in the drawing. The known method can result in a poor appearance at the joint which is deemed objectionable in some circumstances, and the primary object of the present invention is to eliminate that objection. A related object of the invention is to obtain a joint which is mechanically superior to the one obtained when conforming to the prior art.

IN THE DRAWING:

FIGS. 1, 2 and 3 depict the best prior art known to the present inventor;

FIG. 4 is an assembly view showing the present invention;

FIG. 5 is an elevational view of disassembled parts;

FIG. 6 shows the manner in which the present stud may be positioned by a jig;

FIG. 7 shows an intermediate stage of assembly; and

FIG. 8 shows the completed joint.

Prior art known to me is shown in FIGS. 1, 2 and 3, employed to join two tubular parts 10 and 12 in end-to-end relation. Tight joining of tubular parts such as 10 and 12 may be required in the course of constructing automotive luggage racks, furniture, accessories and so on. Also the tubular sections 10 and 12 may be the opposed ends of a single U-shaped piece of tubing.

The known fastener arrangement includes an assembly 14, FIG. 1, comprising a cylindrical member or stud 16 presenting (or supporting) a plurality of elongated flutes or ribs 18 uniformly spaced about the periphery thereof.

An integral circumferential flange 20 protrudes from the mid-section of the cylindrical body 16, separating the ribs as two sets substantially equal in all respects. The outer diameter of the ribs is just slightly larger than the inside diameter of the tubes 10 and 12.

The two tubular members to be joined are telescoped over (press fitted past) the assembly and moved inward toward flange 20 unitl their ends meet the flange 20. This press-fit movement is permitted by reason of the fact the assembly 14 may be composed entirely of plastic, or the ribs 18 may be of a metal more deformable than the tubes.

The completed joint is shown in FIG. 3. The flange 20 is visible and in some assemblies this in itself is deemed objectionable. Also, the tubular members may be steel, plated with nickel and/or chromium. If the flange 20 is of different metal there can be galvanic action which produces objectionable discoloration.

To overcome these objections, the flange 20 is eliminated under and in accordance with the present invention so that the joint, ideally, is nothing more than the hairline L as shown in FIG. 8. The preferred joint is achieved in a manner now to be described.

The present fastener arrangement includes an assembly 24, FIG. 4, comprising a cylindrical member 26 and a plurality of toothed, one-way locking members 28 assembled in opposed relation at the opposite ends of member 26 in a manner which will be clear from the disclosure to follow.

The toothed locking members 28 are of washer shape, that is, they are concave-convex. In the assembled relation, the locking members have their sharp barbs 29 pointing inward toward the medial section of body 26. The diameter of the barb points is just slightly larger than the inside diameter of the tubes 10 and 12.

Instead of a stud with a flange, resort is had to the stud as 26 formed with a keying surface which enables a jig 32 to be keyed thereto as shown in FIG. 6. The jig serves as a stop for the two tubes 10 and 12 engaged against the opposite sides of the jig; the jig is removed, leaving a small space, and the two tubes are then pressed home, until their ends meet, filling the space left by the displaced jig. The resultant joint is evidenced by a mere separation line L, FIG. 8, where the ends are butted against one another. A more detailed explanation of assembly will now be set forth.

The stud 26 has a cylindrical body separated into two cylindrical body portions 34 and 36 by a mid-position keying surface 38 which is the bottom of a cylindrical groove. It is conceivable the keying surface could be a pair of opposed flats, but by forming a groove the resultant circular keying surface 38 has no "correct" position which facilitates assembly, as will be mentioned below.

The end surfaces 40 and 42 of the stud are frusto-conical; the stud has an axial bore 44 extended therethrough and this enables an elongated assembly pin 46 to be positioned in the bore.

As can be seen in FIG. 5, the pin 46 is considerably longer than the stud. This enables one cylindrical sleeve 48 to be positioned on the pin next to the head 50 thereof, before the pin is positioned in the bore, and also enables a second cylindrical sleeve 52 to be located on the free end of the pin 46. The lock elements 28 have openings to fit the pin 46; the sleeves 48 and 52 serve to space elements 28 assembled on the pin.

It will also be noted that by tapering the ends of the stud at 40 and 42 a locking element 28 may be neatly nested with its concave side next to the taper, affording a compact assembly, FIG. 4. As already noted, the barbs or pointed ends point inwardly toward the medial part of the stud, allowing one-way movement of the tubular members 10 and 12 in the permissive direction.

As shown in FIG. 5, the end of the pin opposite the head 50 is countersunk so that after the assembly has been completed the end may be swaged or up-set whereby the locking elements and the sleeves are prevented from displacement. Both ends of the pin 46 may be countersunk. Also, the pin could be machined as an integral part of the stud, whereby the stud 26 and pin 46 are one piece.

As shown in FIG. 6, the keying surface 38 enables the jig 32 to be separably associated with the stud. Specifically, in the preferred keying relationship, the keying surface 38 is circular. Accordingly the jig 32 has a pair of bifurcated arms 54 and 56 spaced from one another by a lateral span which is dimensionally the diameter of the keying surface 38. Therefore this is no preferred orientation.

The jig is also so dimensioned that when keyed to the stud the arms 54 and 56 extend radially outward of the stud groove whereby the opposed surfaces of the jig arms 54 and 56 will serve as stops for the ends of the tubes 10 and 12 when they are press fitted over and past the locking elements until the ends thereof abut the stop surfaces of the jig. The jig may then be removed, whereupon the tubes may then be impacted or forced toward one another until the ends thereof abut, completing the joint which has the neat appearance shown in FIG. 6.

The sleeves and locking washers are not shown in FIGS. 6, 7 and 8 so that there can be a clear perception of the extent the abutted ends of the tubes lap the mid-position groove, and it can be seen from this that there is more resistance to a bending moment compared to the prior art joint, all conditions being equal. This may at first seem not significant but when consideration is given to the weight supported by an automotive luggage rack, and the limitation sometimes placed on cost allowance for materials, the stronger joint indeed becomes significant. For the best support the length $l$ of a cylindrical supporting surface should be about $\frac{3}{4}$ the diameter D.

I claim:

1. Fastener means for joining two tubes in end-to-end butted relationship comprising a stud having an intermediate body portion and respective tapered end surfaces which enable the concave sides of a set of toothed locking elements of concave-convex cross section to be respectively nested against each end surface, said locking elements being so nested, and the body portion of said stud having a keying surface centered mid-way of the length to enable a complemental key surface of a jig to be separably keyed to the mid-section of the stud for supporting the inside diameter of respective tubes having their ends pressed against the opposed sides of said jig, and including an additional set of locking elements, means affording shanks outward of said tapered ends, and spacer sleeves adapted to be mounted on said shanks to space the sets of locking elements.

2. Fastener means according to claim 1 wherein said body portion is cylindrical, and said keying surface being a circumferential groove.

3. Tooling for joining two tubes in end-to-end butted relationship comprising a stud having a jig keying surface positioned mid-way of its length thereby defining supporting surfaces of equal length on opposite sides of said keying surface, shanks of reduced diameter extended outwardly at respective ends of the stud supporting toothed locking washers respectively engaged with the ends of the stud, and a jig having a bifurcation in which the keying surface is disposed for supporting the stud by the jig, and said bifurcation serving as an abutment for the adjacent ends of a pair of tubes fitted over said washers and said supporting surfaces.

4. Tooling according to claim 3 in which said stud is in the form of a cylindrical body formed with frusto-conical ends tapered uniformly to enable the concave side of a toothed locking washer of concave-convex cross section to nest against each end, said keying surface being a circumferential groove, said jig having a pair of bifurcated arms which are spaced apart by a distance substantially equal to the diameter of said groove, for supporting the stud, each of said arms having a height greater than the depth of the groove so that when the arms are in supporting position the excess height serves as an abutment for the adjacent ends of a pair of tubes fitted over said supporting surfaces.

* * * * *